United States Patent [19]

Chou et al.

[11] Patent Number: 5,410,614
[45] Date of Patent: Apr. 25, 1995

[54] RUN-BASED METHOD FOR SMOOTHING HANDWRITTEN CHINESE CHARACTERS

[75] Inventors: Sheng-Li Chou; Shiaw-Shian Yu; Yuan-Cheng Lai, all of Hsinchu, Taiwan, Prov. of China

[73] Assignee: Industrial Technology Research Institute, Hsinchu, Taiwan, Prov. of China

[21] Appl. No.: 141,137

[22] Filed: Oct. 22, 1993

[51] Int. Cl.$^6$ .......................... G06K 9/36; G06K 9/40
[52] U.S. Cl. .......................................... 382/41; 382/54
[58] Field of Search ........................... 382/41, 54, 55; 395/165; 358/261.3

[56] References Cited

U.S. PATENT DOCUMENTS

| | | | |
|---|---|---|---|
| 4,162,482 | 7/1979 | Su | 382/55 |
| 4,360,883 | 11/1982 | Ejiri et al. | 382/54 |
| 4,437,122 | 3/1984 | Walsh et al. | 382/54 |
| 4,466,123 | 8/1984 | Arai et al. | 382/55 |
| 4,783,840 | 11/1988 | Song | 382/55 |
| 5,041,848 | 8/1991 | Gilbert et al. | 346/108 |
| 5,054,102 | 10/1991 | Gaborski | 382/55 |
| 5,081,691 | 1/1992 | Chesley | 382/54 |
| 5,122,884 | 6/1992 | Gilbert et al. | 346/108 |
| 5,142,589 | 8/1992 | Lougheed et al. | 382/55 |
| 5,212,559 | 5/1993 | Gilbert et al. | 346/108 |

*Primary Examiner*—Joseph Mancuso
*Assistant Examiner*—Gerard Del Rosso
*Attorney, Agent, or Firm*—W. Wayne Lianh

[57] ABSTRACT

A preprocessing method for smoothing handwritten Chinese characters before subjecting the same to computerized character recognition and/or other applications. The method disclosed in the present invention is a run-based smoothing method which takes advantages of the unique characteristics of the building blocks of Chinese characters, which consist essentially of vertical, horizontal, and tilted strokes. Accordingly, the two-dimensional array of pixels representing a digitized character are first converted into a run information map which will be repeatedly scanned and subject to three main smoothing treatments: (1) empty run filling, (2) small triangular area filling, and (3) filled run deleting. A unique protocol is developed for effectuating each of the smoothing steps. After each treatment, the run information map is updated, and the treatment steps are repeated until no more empty run filling or filled run deleting can be found, or until a specified number of cycles are exceeded. Since an entire run is used during the filling and deleting steps, the method disclosed in the present invention has the advantage that a strong smoothing effect can be achieved. Furthermore, since a run rather than a pixel is used as the checking unit, the processing speed is fast and efficient.

5 Claims, 7 Drawing Sheets

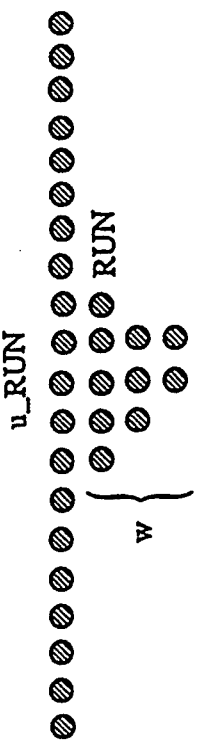
Fig. 2(a)  Fig. 2(b)
Fig. 3(a)  Fig. 3(b)
Fig. 6

RUN-BASED METHOD FOR SMOOTHING HANDWRITTEN CHINESE CHARACTERS

FIELD OF THE INVENTION

This invention relates to a preprocessing method for smoothing handwritten Chinese characters to improve the accuracy and efficiency during subsequent computerized recognition thereof. More particularly, this invention relates to an improved method designed for the preprocessing of digitized handwritten Chinese characters before subjecting the same to computerized recognition and/or other computerized processes; the method discloses in the present invention utilizes a ran-based iterative smoothing procedure to reduce disturbance from noise and thus enhance the accuracy and efficiency during the step of recognition thereof.

BACKGROUND OF THE INVENTION

Character recognition has become an increasingly important and much desired means for entering data Chinese characters, which are used by more than two billion people, present a unique calligraphic proclivity which could be utilized to improve the accuracy and efficiency in a computerized character recognition by subjecting the handwritten characters to a preprocessing procedure to smooth the same prior to the character recognition step. At the present time, very few techniques are available which could provide satisfactory preprocessing treatment before conducting Chinese character recognitions.

SUMMARY OF THE INVENTION

The primary object of the present invention is to provide a preprocessing technique for smoothing handwritten Chinese characters to thereby eliminate or minimize disturbances from undesired noise and/or other interfering factors and improve the accuracy and efficiency of subsequent computerized character recognition. More particularly, the primary object of the present invention is to utilize the unique characteristics of the building blocks of Chinese characters, which consist essentially of vertical, horizontal, and tilted strokes, and combinations thereof, to develop a preprocessing technique for use before subjecting the hand-written characters to the step of character recognition and/or other data processing steps.

The method disclosed in the present invention is a run-based technique. A run is defined as a vertical or horizontal line of continuous pixels of the same identity (i.e., either filled or empty). In applying the method disclosed in the present invention, a character, which has been digitized and converted to a two-dimensional array of pixels, is scanned separately to identify and inventory all the horizontal runs, vertical runs, and small triangular areas, respectively, associated with-the character being processed. A small triangular area is a collection of clustered horizontal or vertical empty runs. This establishes a "run information map", which forms the basis of the steps of the present invention and will be continually scanned (before all the actions in each step are taken) and updated (after the actions are taken) as the process proceeds. In the method disclosed in the present invention, all the runs as well as the small triangular areas are subject to a protocol which has been developed based on the unique characteristics of the strokes of Chinese characters to determine whether and how they should be filled or deleted. The scanning and the filling and deleting steps are repeated until no more filling or deleting is required. Since an entire run is used during the filling and deleting steps, the method disclosed in the present invention has an advantage that a strong smoothing effect can be achieved.

In summary, the method disclosed in the present invention comprises repeated preprocessing cycles, each cycle comprising the steps of empty run filling, small triangular area filling, and filled run deleting. A unique protocol is developed for effectuating the empty run filling, small triangular area filling or filled run deleting step. In a preferred embodiment of the preprocessing procedure of the present invention, each Chinese character is digitized into a two-dimensional array of pixels arranged into R rows and C columns. The array of pixels representing the character are scanned to establish a run information map, which is, as the first step, scanned to identify all the horizontal empty runs. The horizontal empty runs are then either filled or left alone, according to a set of protocol developed in the present invention. A similar procedure is performed for the vertical empty runs. Thereafter, small triangular areas are identified which are also filled or left alone according to their compliance, or the lack thereof, with the criteria developed in the present invention. Finally, filled runs are identified horizontally as well as vertically which are deleted or left alone depending on their compliance with the criteria disclosed in the present invention. The above cycle is repeated until no more filling or deleting is to be done. The individual steps, i.e., the empty run filling, the small triangular area filling, and the filled run deleting, disclosed in the method of the present invention can be conducted in any desired order different from the above described preferred embodiment. For example, the step of filled run deleting can be performed before the step of empty run filling. Also, during the run deleting or filling, vertical runs can be processed prior to the processing of horizontal runs. Other arrangements can be practiced in any order, depending on the style of the handwriting of each individual, and/or the type of characters being processed.

BRIEF DESCRIPTION OF THE DRAWINGS

FIGS. 2(a) and 2(b) are an illustration of a partial empty run filling procedure.

FIGS. 3(a) and 3(b) are an illustration of a complete empty run filling procedure.

FIG. 6 is an illustration of a filled run deleting procedure.

DETAILED DESCRIPTION OF THE PREFERRED EMBODIMENT

Figure 1:
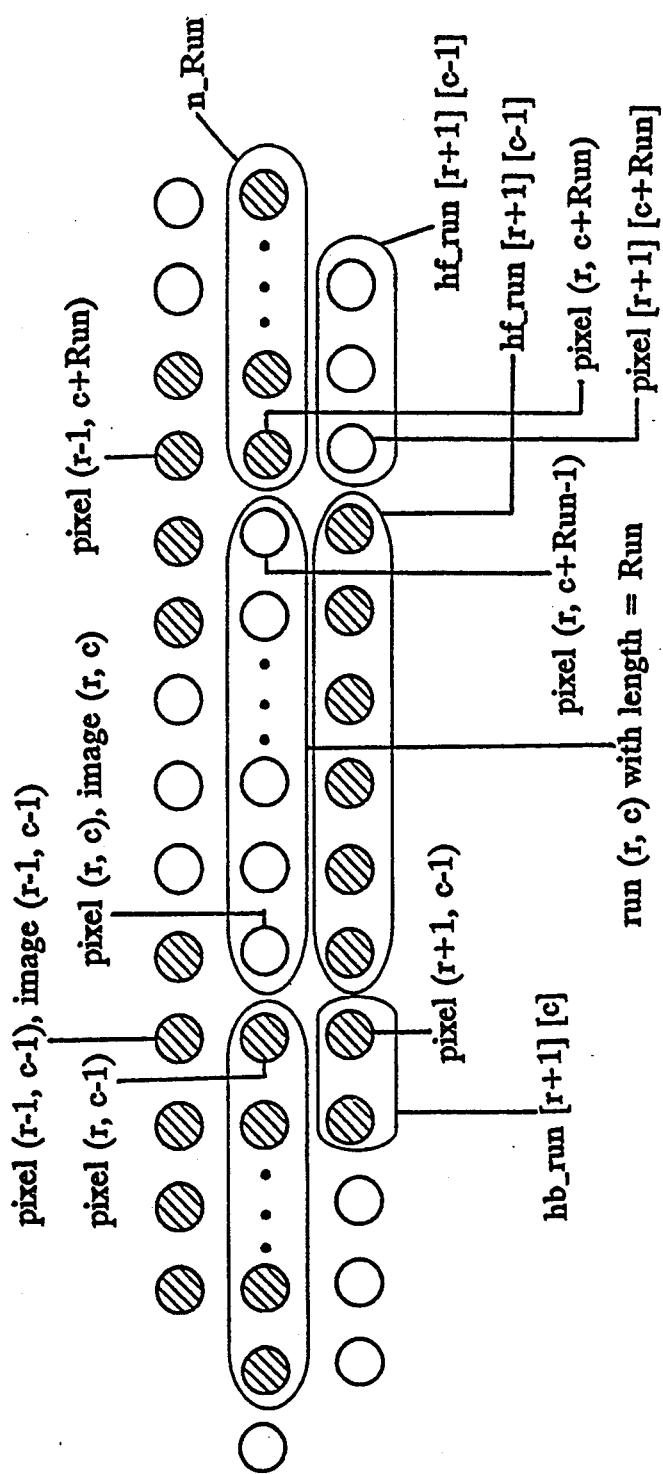
FIG. 1 is an illustration showing the first step in the empty run filling procedure in which an empty run is identified which is sandwiched between a previous filled run and a next filled run.

The present invention will now be described more specifically with reference to the following preferred embodiment. It is to be noted that the following descriptions of the preferred embodiment of this invention are presented herein for purpose of illustration and description; it is not intended to be exhaustive or to limit the invention to the precise form disclosed.

The present invention discloses a method for preprocessing a handwritten Chinese character before subjecting the same to a computerized character recognition or applications. In the method disclosed herein, a handwritten Chinese character to be recognized is first digitized into a two-dimensional R (rows) x C (columns) array of pixels. Each pixel is identified as being either an empty (i.e., white) or filled (i.e., black as shown in the drawings) pixel. Typically, a handwritten Chinese character to be recognized is digitized into a 64×64 array of pixels, then a run information map is established from the pixel array. The preprocessing method disclosed in the present invention comprises three main steps, namely: (A) empty run filling, (B) small triangular area filling, and (B) filled run deleting. After each step, the run information map is updated which forms the basis of the next step. These three main steps are described in better detail below:

(A) Empty Run Filling:

In the first step of the preprocessing procedure of a preferred embodiment of the present invention, the run information map is scanned to identify horizontal empty runs. As shown in FIG. 1, an empty run, RUN, is identified as being sandwiched between two filled runs, a filled run prior to the empty RUN, p_RUN; and a filled run next to the empty RUN, n_RUN. The next step is to determine whether this empty RUN, should be filled or left alone. In the descriptions that follow, only the filling procedure for horizontal empty runs is provided. The filling procedure for vertical empty runs uses the same procedure, and is thus omitted.

Since the method disclosed in the pre, sent invention utilizes a run-based approach, it is pertinent to define four types of run lengths in the vertically upward, vertically downward, horizontally forward, and horizontally backward directions, respectively, measured from any point (r, c), i.e., pixel, in the image array:

vu_run[r][c]: vertically upward run;
vd_run[r][c]: vertically downward run;
hb_run[r][c]: horizontally backward run; and
hf_run[r][c]: horizontally forward run.

Horizontally backward and forward runs are useful during the horizontal scanning and vertically upward and downward runs are useful during the vertical scanning to determine whether and how a run should be filled or deleted.

With the definitions described above, we can re-state the empty RUN shown in FIG. 1, as being a run which starts at point (r, c) and is identified to have a length of RUN, a "prior" run (i.e., horizontally backward run) and a "next" run (i.e., horizontally forward run) having lengths of p-RUN, and n-RUN, respectively.

To determine whether the empty RUN as shown in FIG. 1 should be filled, the following necessary conditions must be met:

(1) Run length restriction: The run length RUN must be less than a certain predetermined value, i.e.,:

RUN < MAX_RUN_TO_BE_FILLED wherein MAX_RUN_TO_BE_FILLED is a predetermined, constant. Because of other constraints, the value of MAX_RUN_TO_BE_FILLED need not be too stringent. Typically for a 64×64 pixel array, the preferred value of MAX_RUN_TO_BE_FILLED is about 15.

(2) The run to be filled should be of secondary significance: The length of the empty run to be filled should not be greater than both of its neighboring runs within the same row during the horizontal scanning. Mathematically, either one, of the two following conditions must be met,
RUN < p_RUN or RUN < n_RUN (3) Connectivity of horizontally forward and backward runs: The two sandwiching rum, i.e., p_RUN and n_RUN should be connected, at either above or below the empty RUN to be filled, by a continuous horizontal filled run, i.e., either of the two following conditions must be met:

image[r−1][c−1]=1 and
hf−run[r−1][c−1] ≧ (RUN+2); or     (i)

image[r+1][c−1]=1 and
hf−run[r+1][c−1] ≧ (RUN+2)     (ii)

The expression that image equaling one indicate a filled pixel. Condition (i) indicates that p-RUN and n-RUN are connected by a continuous horizontal filled run above the empty RUN to be filled (i.e., at [r−1] row). Condition (ii) indicates that p-RUN and n-RUN are connected by a continuous horizontal filled run below the empty RUN to be filled (i.e., at [r+1] row).

If the empty run, RUN, as shown in FIG. 1 satisfies the above described necessary conditions, it is then decided whether partial filling or complete filling should be performed. This is discussed below:

(1) Partial run filling: FIGS. 2(a) and 2(b) show an empty run before and after the partial filling, respectively. In partial filling, only those portions of the run that are bounded by two filled pixels above and below are filled. Other portions of the empty run remain empty.

(2) Complete run filling: FIGS. 3(a) and 3(b) show an empty run before and after the complete filling, respectively. Complete filling is performed when the empty run is bound in its entirety by two black runs.

Figure 4:
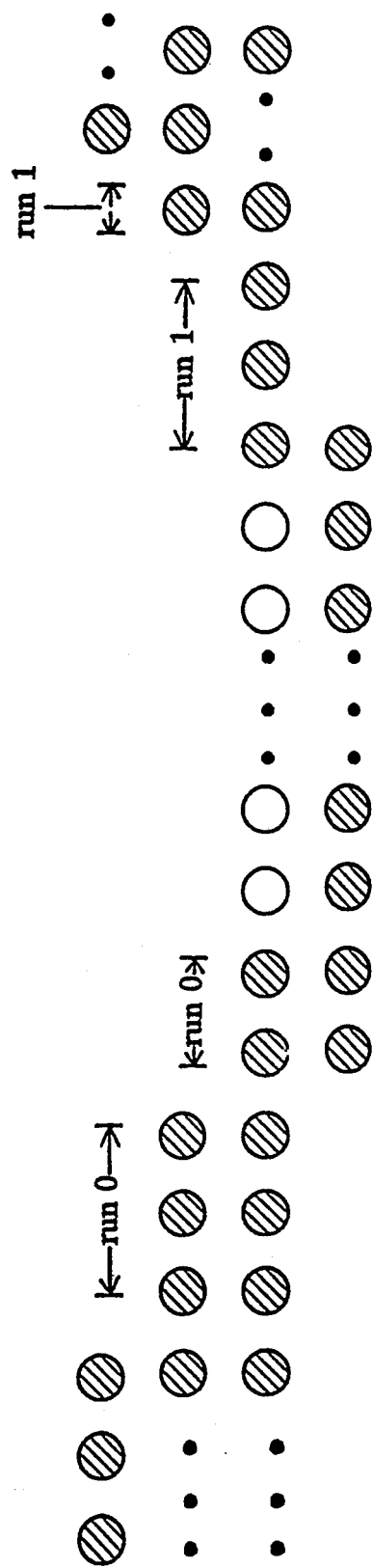
FIG. 4 is an illustration of a complete empty run filling procedure in a flat-bottomed-V environment.

(3) Flat-bottomed V complete filling: In addition to the above mentioned complete filling condition, an empty rim will also be completely filled if it satisfies a flat-bottomed V complete filling condition as illustrated in FIG. 4. The flat-bottomed V complete filling condition requires that an empty run is confined, above or below, by a flat-bottomed V-shaped valley.

In FIG. 4, run0 is the horizontal backward empty run length at $[r-n, c_n]$ (i.e., hf_run$[r-n, c_n]$), wherein n is an integer from 1 through k, k is an integer preferably between 2 and 5, and $c_n$ is the beginning column position (or number) of the empty run ended at $[r-n+1, c_{n-1}]$, minus one. Furthermore, $c_o$ is the beginning column position of the empty run being checked, i.e., $c_o=c$. The variable run1 is the horizontal forward empty run length at $[r-n, c'_n]$ (i.e., hf_run$[r-n, c'_n]$), wherein n is an integer from 1 through k, k is an integer preferably between 2 and 5, and $c'_n$ is the end column position of the empty run beginning at $[r-n+1, c'_{n-1}]$ plus one and $c'_o = c' + \text{RUN} - 1$. Mathematically, the above paragraph can be restated as follows:

In FIG. 4, the k lines above the empty run (at [r, c]) being examined are checked for their compliance with the flat-bottomed V condition (k is an integer preferably between 2 and 5). The relatively small value of k indicates that the valley to be filled should not be too deep. To perform the flat-bottomed V filling, it is useful to first define the following parameters, $c_o$, $c'_o$, run0 and run1, wherein:

$$c_o = c,$$

$$c'_o = c' + \text{RUN} - 1,$$

$$\text{run0} = \text{run1} = 0,$$

$$\text{sum\_run0} = \text{sum\_run1} = 0.$$

In the above expressions, run0 and run1 should be $\text{run0}_o$ and $\text{run1}_o$, respectively, and sum_run0 and sum_run1 should be $\text{sum\_run0}_o$ and $\text{sum\_run1}_o$, respectively. However, for simplicity, the subscripts are omitted.

Next, we check the condition of the nth line, n=1, 2, ..., k, above the current run, the values of $c_o$, $c'_o$, run0, run1, sum_run0 and sum_run1 for the n-th line are calculated as follows:

$$c_n = c_{n-1} - \text{run0} - 1,$$
$$c_n' = c_{n-1}' + \text{run1} + 1,$$

$$\text{run0} = \begin{cases} 0 & \text{if image } [r-n, c_n] = 1 \\ hb\_run[r-n, c_n] & \text{otherwise} \end{cases}$$

$$\text{run1} = \begin{cases} 0 & \text{if image}[r-n, c_n'] = 1 \\ hf\_run[r-n, c_n'] & \text{otherwise} \end{cases}$$

$$\text{sum\_run0} = \text{sum\_run0} + \text{run0}$$
$$\text{sum\_run1} = \text{sum\_run1} + \text{run1}$$

Image [r,c] is the designation, i.e., being either filled or empty, of pixel[r,c]. Again, the subscripts for run0, run1, $\text{sum\_run0}_o$, and $\text{sum\_run0}_o$ are omitted. The values of run0, run1, $\text{sum\_run0}_o$, and $\text{sum\_run0}_o$ so obtained are then checked against the following two conditions:

$$\text{run0} \geq \text{V\_RUN and run1} \geq \text{V\_RUN; or} \qquad (i)$$

$$\text{sum\_run0} \geq \text{SUM\_V\_RUN and}$$
$$\text{sum\_run1} \geq \text{SUM\_V\_RUN} \qquad (ii)$$

In conditions (i) and (ii), V_RUN and SUM_V_RUN are two predetermined constants, respectively. In condition (ii), sum_run0 and sum_run1 are the accumulations of all the run0's and run1's up to now, respectively. If either of the above two conditions is met, then all the empty runs in the valley from the n-th line down to the line being examined are changed to filled runs. Otherwise, the above procedure is repeated for next line, i.e., n=n+1, until n>k. If the flat,bottomed V condition is not satisfied for the k lines above, then no filling operation will be performed.

After the horizontal runs are processed, the run information map is updated and scanned again to process the vertical runs using a similar approach.

Figure 5:
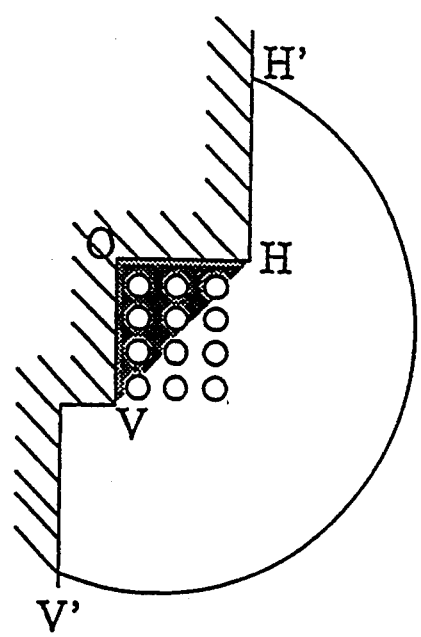
FIG. 5 is an illustration of a small triangular area filling procedure.
Figure 7A:
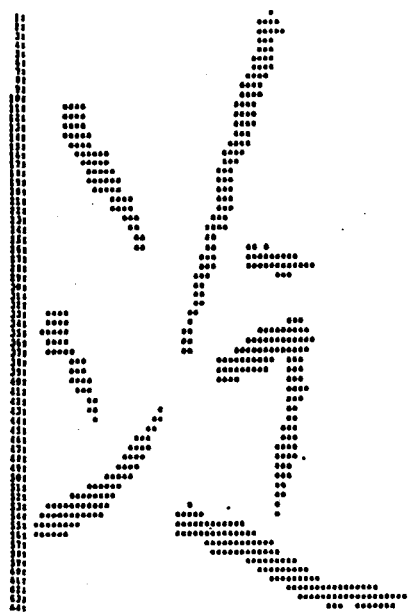
FIGS. 7(a) and (b) show comparison of a digitized Chinese character "ubiquitous" before and after, respectively, the preprocessing smoothing treatment disclosed in the present invention.
Figure 7B:
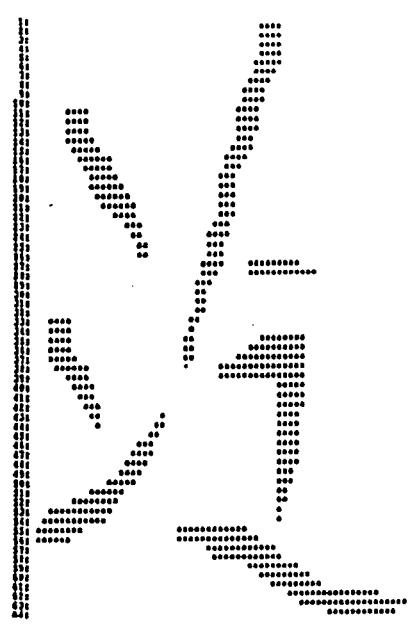
Figure 8A:
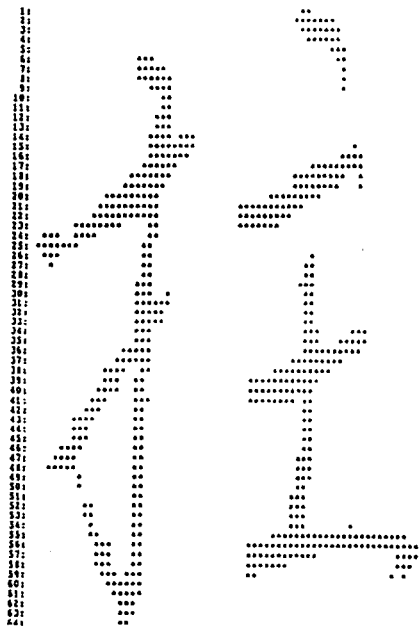
FIGS. 8(a) and (b) show comparison of a digitized Chinese character "column" before and after, respectively, the preprocessing smoothing treatment disclosed in the present invention.
Figure 8B:
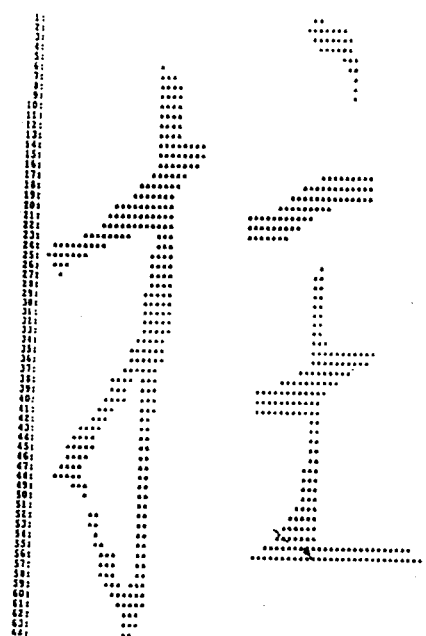
Figure 9A:
FIGS. 9(a) and (b) show comparison of a digitized Chinese character "fear" before and after, respectively, the preprocessing smoothing treatment disclosed in the present invention.
Figure 9B:
Figure 10A:
FIGS. 10(a) and (b) show comparison of a digitize, d Chinese character "deep water" before and after, respectively, the preprocessing smoothing treatment disclosed in the present invention.
Figure 10B:
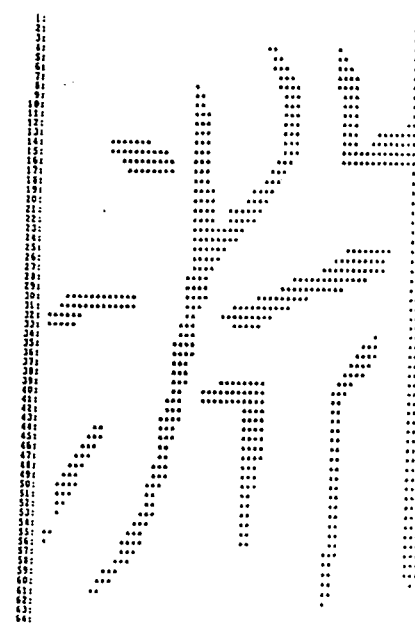
Figure 11A:
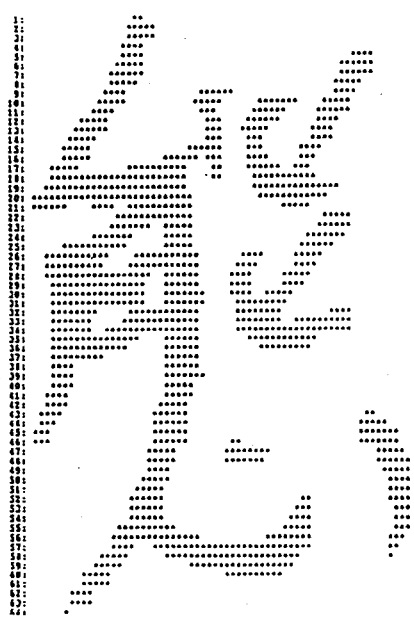
FIGS. 11 (a) and (b) show comparison of a digitized Chinese character "manner" before and after, respectively, the preprocessing smoothing treatment disclosed in the present invention.
Figure 11B:

(B) Small Triangular Area Filling:

Small triangular area filing, which is illustrated in FIG. 5, performs area-wide filling. It is particularly useful in smoothing diagonal or tilted strokes. The small empty triangular area to be filled is defined by two filled runs OH and OV. FIG. 5 represents a leftward and downward stroke as shown in the lower left portion of the Chinese characters of FIG. 10 or FIG. 11. The conditions under which the empty triangular area $\Delta$HOV will be filled are described below (assuming the pixel O has a coordinate of [r, c]):

(1) hf_run$[r-1][c-1]$ < hf_run$[r][c]$ and
vd_run$[r-1][c-1]$ < vd_run$[r][c]$;

(2) H_RUN < TRIANGLE_SIZE or
V_RUN < TRIANGLE_SIZE;

wherein:
H_RUN = min(hf_run$[r-1][c-1]$, TRIANGLE_SIZE) and
V_RUN = min(vd_run$[r-1][c-1]$, TRIANGLE_SIZE);
and (3) the angle between OH' and OV' is greater than 135°, wherein H' and V' are any two respective filled pixels at a distance of m filled pixels from O, m is a predetermined constant; both H' and V' are connected to O through a continuity of filled pixels but are separated by said right angle triangular area of said plurality of empty runs. The third condition ensures that the points H, 0, and V are in the same stroke.

The above procedure applies to empty triangular areas located in the south-eastern quadrant relative to the filled runs OH and OV. Similar procedures are applied to triangular areas in the north-eastern, south-western, and north-western quadrants.

(C) Filled Run Deleting:

The procedure for filled run deleting is illustrated in FIG. 6, in which the filled run to be deleted has a run length RUN, and a beginning pixel position [r, c]. To determine whether the filled run should be deleted, two run lengths, an upper filled run with a length of u_RUN and a lower filled run with a length of d_RUN, are respectively defined as follows:

u_RUN = 0 if image$[r-1][c]$ =

0 or image$[r-1][c+\text{RUN}-1]$ = 0;

otherwise,
u_RUN = hf_run$[r-1][c]$ + hb_run$[r-1][c]$ - 1;

d_RUN = 0 if image$[r+1][c]$ =

0 or image$[r+1][c+\text{RUN}-1]$ = 0;

otherwise, d_RUN = hf_run[r + 1][c] + hb_run[r + 1][c] − 1;

To delete a filled run, the following conditions must be met:
(1) RUN<MAX_RUN_TO_BE_DELETED, wherein MAX_RUN_TO_BE_DELETED is a predetermined constant. This condition limits the maximum length above which a black will never be deleted;
(2) (i) u_RUN≧2×RUN and u_RUN>LEN_TO_DELETE_NGHB, or (ii) d_RUN≧2×RUN and d_RUN>LEN_TO_DELETE_NGHB, wherein LEN_TO_DELETE_NGHB is a predetermined constant; and If the above conditions are met then the third condition is tested:
(3) Width test: In the filled horizontal run deleting, a plurality of w filled horizontal runs connected thereto (above or below it) can also be delete simultaneously, w is called the width of the plurality of filled runs. The test conditions are:
 (i) w<W, wherein W is a predetermined constant, preferably no greater than 5; and
 (II) all the w filled runs have beginning and end pixels within the two ends of the filled run that has been tested under conditions (1) and (2).

If all the above conditions are met, then the filled run being tested and all the w filled runs will be deleted. After the horizontal runs are processed, the run information map is updated and scanned to process the vertical runs using a similar approach.

This completes one cycle of the three main preprocessing steps of the present invention, namely: empty run filling, small triangular area filling, and filled run deleting. The same steps will be repeated until no more filling/deleting can be made. If the process does not converge, a maximum number of cycles can be specified.

The foregoing description of the preferred embodiment of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for smoothing a Chinese character that has been digitized and converted to a two-dimensional array of pixels, said two-dimensional array having a plurality of rows in a first direction designated as horizontal direction and a plurality of columns in a second direction designated as vertical direction and each pixel being assigned a (row, column) coordinate, said method comprising the steps of:
 (a) assigning a designation to every said pixel as either a filled pixel or an empty pixel;
 (b) establishing a first horizontal run map by identifying all horizontally connected pixels of the same designation, i.e., of being either filled or empty, as a plurality of horizontal runs, respectively, each of said horizontal runs comprising a leftmost pixel and a rightmost pixel and being identified by the (row, column) coordinate of its leftmost pixel and the number of pixels contained therein, each horizontal run also being designated as either a filled run or an empty run in accordance with the designation of said horizontally connected pixels contained therein;
 (c) performing a horizontal empty run filling operation by checking each of said empty horizontal runs in said first horizontal run map against a first criterion, and changing the designation of said horizontal empty run and those of said pixels contained therein, into a filled run and filled pixels, respectively, if said first criterion is met;
 (d) establishing a first vertical run map by identifying all vertically connected pixels of the same designation as a plurality of vertical runs, respectively, each of said vertical runs being identified by the (row, column) coordinate of its topmost pixel and the number of pixels contained therein, each vertical run also being designated as either a filled run or an empty run in accordance with the designation of said vertically connected pixels contained therein;
 (e) performing a vertical empty run filling operation by checking each of said empty vertical runs in said first vertical run map against a second criterion, and changing the designation of said vertical empty run, and those of said pixels contained therein, into a filled run and filled pixels, respectively, if said second criterion is met;
 (f) establishing a small triangular area map by identifying all empty pixels, which are arranged in the shape of a right-angle triangle and enclosed by two perpendicularly intersecting filled runs, into a plurality of triangular areas, respectively;
 (g) performing a small triangular area filling operation by checking each of said triangular areas in said small triangular area map against a third criterion, and changing the designation of all said pixels contained in said triangular area into filled pixels if said third criterion is met;
 (h) establishing a new horizontal run map according to the procedure described in step (b) above;
 (i) performing a horizontal filled run deleting operation by checking each of said filled horizontal runs in said new horizontal run map against a fourth criterion, and changing the designation of said horizontal filled run, and those of said pixels contained therein, into an empty run and empty pixels, respectively, if said fourth criterion is met;
 (j) establishing a new vertical run map according to step (d) above; and
 (k) performing a vertical filled run deleting operation by checking each of said filled vertical runs in said new vertical run map against a fifth criterion, and changing the designation of said vertical filled run, and those of said pixels contained therein, into an empty run and empty pixels, respectively, if said fifth criterion is met.

2. The method for smoothing a Chinese, character according to claim 1 wherein said step of horizontal empty run filling comprises the following sub-steps:
 (a) scanning said run information map to identify horizontal empty runs, each horizontal empty run being identified by the row and column coordinates of its leftmost pixel and the number of filled pixels contained therein, and defining the following variables:

RUN_H as the number of filled pixels of each horizontal empty run being processed, p_RUN_H as the number of filled pixels of a horizontal filled run to the left of said horizontal empty run being processed, n_RUN_H as the number of filled pixels of a horizontal filled run to the right of said horizontal empty run being processed, MAX_RUN_TO_BE_FILLED_H as a predetermined constant, c and r as the column and row coordinates, respectively, of said horizontal empty run being processed, hf_run[r−1][c−1] as the number of filled pixels above said horizontal run being processed, hf_run[r+1][c−1] as the number of filled pixels below said horizontal run being processed, image[r−1][c−1] as the designation of a pixel above and to the left of said horizontal empty run being processed, and image[r+1][c−1] as the designation of a pixel below and to the left of said horizontal empty run being processed;

(b) checking each horizontal empty run against the following criteria:
(i) RUN_H<MAX_RUN_TO_BE_FILLED_H,
(ii) RUN_H<p_RUN_H or RUN_H<n_RUN_H, and
(iii) image[r−1][c−1]=filled, and hf_run[r−1][c−1]≧(RUN_H+2), or image[r+1][c−1]=filled, and hf_run[r+1][c−1]≧(RUN_H+2);

(c) changing the designation of said empty pixels contained in said horizontal empty run that are bound above and below by filled pixels to filled pixels if the conditions in (b) are met.

3. The method for smoothing a Chinese character according to claim 2 wherein said step of horizontal empty run filling further comprises the following sub-steps:

(a) identifying a plurality of accessory horizontal empty runs immediately above said horizontal run being operated and defining V_RUN and SUM_V_RUN as two respectively predetermined constants;

(b) for each of said plurality of accessory horizontal empty runs, defining the following variables:
run0 as the number of empty pixels to the left of a horizontal empty run immediately below said accessory horizontal run,
run1 as the number of empty pixels to the right of a horizontal empty run immediately below said accessory horizontal run;

(c) calculating the cumulative values of run0 and run 1, and designating these values as sum_run0 and sum_run1, respectively;

(d) determining whether the following conditions are met:
(i) run0≧V_RUN and run1≧V_RUN for each accessory empty run; or
(ii) sum$_{run0}$≧SUM_V_RUN and sum_run1≧SUM_V_RUN;

(e) changing the designations of all the pixels of said horizontal empty runs from empty to filled if one of the two conditions of (d) is met.

4. The method for smoothing a Chinese character according to claim 1 wherein said step of small triangular area filling comprises the following sub-steps:

(a) scanning said run information map to identify a right angle triangular area comprising a plurality of empty runs bound by a bounding horizontal filled run or a part thereof OH, and a bounding vertical filled run or a part thereof OV that are perpendicular to each other and intersect at point O;

(b) defining TRIANGLE_SIZE as a predetermined constant;

(c) selecting an accessory horizontal empty run within said right triangular area which is immediately adjacent to said bounding horizontal run, and selecting an accessory vertical empty run within said right triangular area which is immediately adjacent to said bounding vertical run, (d) selecting two arbitrary point H' and V', which are separated by said small triangular area and respectively connected to OH and OV by at least a predetermined number of filled pixels, and measuring the angle between OH' and OV';

(d) determining whether the following conditions are met:
(i) the lengths of said accessory empty runs are shorter than the lengths of said bounding filled runs respectively;
(ii) the lengths of said accessory empty runs in (i) are shorter than TRIANGLE_SIZE, and
(iii) the angle between OH, and OV' is greater than 135°; and (e) changing the identity of all the pixels in said right angle triangle area from empty to filled if the conditions of (d) are met.

5. The method for smoothing a Chinese character according to claim 1 wherein said horizontal filled run deleting operation comprises the following steps:

(a) scanning said run information map to identify horizontal filled runs, each horizontal filled run being identified by the row and column coordinates of its leftmost pixel and the number of filled pixels contained therein (b) defining the following variables:
c and r as the column and row coordinates, respectively, of said horizontal filled run being processed,
RUN as the number of filled pixels of each horizontal filled run being processed,
MAX_RUN_TO_BE_DELETED as a predetermined constant,
hf_run[r−1][c] as the number of filled pixels of a horizontal run above and to the right of said horizontal run being processed,
hb_run[r−1][c] as the number of filled pixels of a horizontal run above and to the left of said horizontal run being processed,
image[r−1][c] as the designation of a pixel above the leftmost pixel of said horizontal empty run being processed,
image[r−1][c+RUN−1] as the designation of a pixel above the rightmost pixel of said horizontal empty run being processed;
hf_run[r+1][c] as the number of filled pixels of a horizontal run below and to the right of said horizontal run being processed, hb_run[r+1][c] as the number of filled pixels of a horizontal run below and to the left of said horizontal run being processed, image[r+1][c] as the designation of a pixel below the leftmost pixel of said horizontal empty run being processed, and image[r+1][c+RUN−1] as the designation of a pixel below the rightmost pixel of said horizontal empty run being processed;

(c) calculating u_RUN as follows:
 (i) u_RUN=0 if image[r−1][c]=0 or image[r−1][c+RUN]=0; otherwise, u_RUN=hf_run[r−1][c]+hb_run[r−1][c]−1, wherein hf_run is a horizontally forward run and hb_run is a horizontally backward run;

(d) calculating d_RUN as follows:
 (i) d_RUN=0 if image[r+1][c]=0 or image[r+1][c+RUN−1]=0; otherwise, d_RUN=hf_run[r+1][c]+hb_run[r+1][c]−1;

(e) determining whether the following conditions are met:
 (i) RUN<MAX_RUN_TO_BE_DELETED, wherein MAX_RUN_TO_BE_DELETED is a predetermined constant;
 (ii) u_RUN≧2×RUN and u_run>LEN_TO_DELETE_NGHB, or d_RUN≧2×RUN and d_run>LEN_TO_DELETE_NGHB, wherein LEN_TO_DELETE_NGHB is a predetermined constant;

(f) changing the identity of all file pixels of said black run from black to empty if the conditions of (e) are met.

* * * * *